United States Patent
Ono et al.

(10) Patent No.: US 11,072,303 B2
(45) Date of Patent: Jul. 27, 2021

(54) UPPER INTERIOR STRUCTURE OF VEHICLE

(71) Applicant: MAZDA MOTOR CORPORATION, Hiroshima (JP)

(72) Inventors: Yuji Ono, Aki-gun (JP); Shoji Okano, Aki-gun (JP); Hiroshi Nagai, Hiroshima (JP); Katsunori Monden, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 82 days.

(21) Appl. No.: 16/569,942

(22) Filed: Sep. 13, 2019

(65) Prior Publication Data
US 2020/0101924 A1  Apr. 2, 2020

(30) Foreign Application Priority Data

Sep. 27, 2018  (JP) .............................. JP2018-182052

(51) Int. Cl.
*B60R 21/213* (2011.01)
*B60R 13/02* (2006.01)
*B60R 21/232* (2011.01)
*B60R 21/16* (2006.01)
(Continued)

(52) U.S. Cl.
CPC .......... *B60R 21/213* (2013.01); *B60R 13/025* (2013.01); *B60R 13/0212* (2013.01); *B60R 21/232* (2013.01); *B60R 21/2334* (2013.01); *B60R 21/23138* (2013.01); *B60R 2021/161* (2013.01)

(58) Field of Classification Search
CPC ............ B60R 21/213; B60R 21/23138; B60R 21/232; B60R 21/2334; B60R 13/0212; B60R 13/025; B60R 2013/0293; B60R 2021/161
See application file for complete search history.

(56) References Cited

U.S. PATENT DOCUMENTS 6,305,707 B1 * 10/2001 Ishiyama ............... B60R 21/213
280/728.2
7,780,190 B2 * 8/2010 Yamagiwa ............ B60R 21/213
280/730.2
(Continued)

FOREIGN PATENT DOCUMENTS

JP  2014-015087 A  1/2014

*Primary Examiner* — Paul N Dickson
*Assistant Examiner* — Caitlin Anne Miller
(74) *Attorney, Agent, or Firm* — Studebaker & Brackett PC

(57) ABSTRACT

In an upper interior structure of a vehicle of the present invention, a deployment guide portion for guiding a curtain airbag toward a cabin side when the curtain airbag is deployed. The deployment guide portion comprises a first guide part and a second guide part. The first guide part is arranged above a top ceiling and on an outward side, in a vehicle width direction, of the curtain airbag, facing an upper end portion of a pillar trim, so as to restrain the curtain airbag from being deployed outwardly in the vehicle width direction. The second guide part is arranged between the first guide part and the top ceiling, extending in a vertical direction, so as to restrain the curtain airbag from being deployed into a gap between the first guide part and the upper end portion of the pillar trim.

5 Claims, 16 Drawing Sheets

(51) Int. Cl.
*B60R 21/231* (2011.01)
*B60R 21/2334* (2011.01)

(56) References Cited

U.S. PATENT DOCUMENTS

| | | | | |
|---|---|---|---|---|
| 7,810,838 B2* | 10/2010 | Iwayama | ............ | B60R 13/0225 |
| | | | | 280/730.2 |
| 8,876,152 B1* | 11/2014 | Zucal | ............ | B60R 21/20 |
| | | | | 280/728.3 |
| 9,174,602 B1* | 11/2015 | Moore | ............ | B60R 21/213 |
| 9,586,554 B1* | 3/2017 | Baer | ............ | B60R 13/025 |
| 10,300,879 B2* | 5/2019 | Hirayama | ............ | B60R 21/232 |
| 2014/0070522 A1* | 3/2014 | Kurahashi | ............ | B60R 21/23138 |
| | | | | 280/730.2 |
| 2014/0110922 A1* | 4/2014 | Uchida | ............ | B60R 13/0212 |
| | | | | 280/730.2 |
| 2018/0015900 A1* | 1/2018 | Hirayama | ............ | B60R 21/213 |

* cited by examiner

UPPER INTERIOR STRUCTURE OF VEHICLE

BACKGROUND OF THE INVENTION

The present invention relates to an upper interior structure of a vehicle, which comprises a pillar trim attached to a pillar which partitions an opening portion of the vehicle and covering the pillar from a side of a cabin and a top ceiling provided above the pillar trim and covering a ceiling of the cabin.

Conventionally, the vehicle is equipped with the top ceiling covering the ceiling of the cabin and the pillar trim covering the pillar partitioning the opening portion of the vehicle from the side of the cabin, as an interior member, at an upper part of the vehicle. The vehicle may be equipped with an airbag device to protect an occupant (passenger) in a vehicle collision or the like as well.

Japanese Patent Laid-Open Publication No. 2014-15087, for example, discloses a vehicle, which is equipped with a pillar trim (B pillar garnish), a top ceiling (roof head lining), and an airbag device (a so-called curtain airbag device) which is configured such that a curtain airbag is deployed in a cabin from an upper side of the top ceiling so as to cover a cabin-side wall in a vehicle collision or the like.

In the vehicle disclosed in the above-described patent document, a slant portion to promote deployment of the curtain airbag in the cabin is arranged above the pillar trim. Specifically, the slant portion is provided below the curtain airbag and configured to slant (i.e., extend obliquely) in such a manner that its lower side is located at an inward position in a vehicle width direction, whereby the curtain airbag is restrained from being deployed obliquely downwardly-and-outwardly.

According to the vehicle equipped with the slant portion disclosed in the above-described patent document, the curtain airbag may be inflated promptly. However, a gap is formed between the slant portion and the pillar trim in the vehicle disclosed in the patent document because the slant portion is provided below the curtain airbag as described above. That is, since the slant portion is deformed downwardly when receiving an expansion force from the curtain airbag in the above-described vehicle, the above-described gap is previously formed in order to avoid interference of the slant portion with the pillar trim. Therefore, there is a concern that when the curtain airbag is deployed, the curtain airbag may come into the gap between the slant portion and the pillar trim and thereby be caught by the pillar trim or the like. While this catch of the curtain airbag is avoidable by some ingenuity of the shape of an upper end portion of the pillar trim, this may deteriorate the flexibility of design of the pillar trim because the design of the pillar trim is improperly restricted.

SUMMARY OF THE INVENTION

The present invention has been devised in view of the above-described matter, and an object of the present invention is to provide an upper interior structure of a vehicle which can properly improve the design flexibility, attaining the prompt deployment of the curtain airbag.

The present invention is an upper interior structure of a vehicle, comprising a pillar trim attached to a pillar which partitions an opening portion of the vehicle and covering the pillar from a side of a cabin, a top ceiling provided above the pillar trim and covering a ceiling of the cabin, a curtain airbag stored above the top ceiling and capable of being deployed so as to cover a side wall of the cabin, a deployment guide portion for guiding the curtain airbag toward the side of the cabin when the curtain airbag is deployed, wherein the deployment guide portion comprises a first guide part and a second guide part, the first guide part being arranged above the top ceiling and on an outward side, in a vehicle width direction, of the curtain airbag, facing an upper end portion of the pillar trim, so as to restrain the curtain airbag from being deployed outwardly in the vehicle width direction, the second guide part being arranged between the first guide part and the top ceiling, extending in a vertical direction, so as to restrain the curtain airbag from being deployed into a gap between the first guide part and the upper end portion of the pillar trim.

According to the present invention, there is provided the deployment guide portion for guiding the curtain airbag toward the side of the cabin when the curtain airbag is deployed, and the deployment guide portion is provided with the second guide part which is arranged between the first guide part and the top ceiling, extending in the vertical direction, so as to restrain the curtain airbag from being deployed into the gap between the first guide part and the pillar trim, in addition to the first guide part which is arranged on the outward side, in the vehicle width direction, of the curtain airbag so as to restrain the curtain airbag from being deployed outwardly in the vehicle width direction. Accordingly, the inward-side deployment of the curtain airbag can be promoted by the first guide part of the deployment guide portion, and also it can be properly restrained by the second guide part of the deployment guide portion that the curtain airbag comes into the gap between the first guide part and the pillar trim and thereby is caught by the pillar trim or the like. Therefore, it becomes unnecessary that the shape of the pillar trim is limited to the one which is superior in avoiding the above-described catch of the curtain airbag, so that the curtain airbag can be promptly deployed in the cabin, improving the design flexibility of the pillar trim and thereby the design flexibility of the interior of the vehicle.

In an embodiment of the present invention, the first guide part of the deployment guide portion is configured to extend in a vehicle longitudinal direction and in the vertical direction, the deployment guide portion further comprises a bottom wall part which is configured to extend outwardly, in the vehicle width direction, from a lower end portion of the first guide part, and the second guide part of the deployment guide portion is comprised of plural parts which are respectively configured to extend downwardly from the bottom wall part and spaced apart from each other in the vehicle longitudinal direction.

According to this embodiment, the rigidity of the first guide part of the deployment guide portion can be increased by the bottom wall part, and the outward-side deployment of the curtain airbag can be restrained more securely by the first guide part.

Herein, the rigidity of the second guide part of the deployment guide portion may be lower than that of the first guide part of the deployment guide portion as long as the second guide part has the ability of restraining the curtain airbag from coming into the gap between the first guide part and the pillar trim. In this embodiment, the second guide part is provided at the bottom wall part configured to extend outwardly, in the vehicle width direction, from the lower end portion of the first guide part such that the plural parts of the second guide part are spaced apart from each other in the vehicle longitudinal direction. That is, the second guide part of the deployment guide portion is provided such that the plural parts of the second guide part are distributed on the bottom wall part, not provided at a whole area, in the vehicle longitudinal direction, of the bottom wall part. Accordingly, the weight of the second guide part and thereby the entire weight of the deployment guide portion can be made properly light, retraining the curtain airbag from coming into the gap between the first guide part and the pillar trim by means of the second guide part.

In another embodiment of the present invention, each of the plural parts of the second guide part of the deployment guide portion is of a plate shape having a face substantially perpendicular to the vehicle longitudinal direction.

According to this embodiment, the outward-side deployment of the curtain airbag can be also restrained by the second guide part having the appropriately-increased rigidity. Further, the gap between the first guide part and the pillar trim can be closed along the vehicle width direction with the second guide part, whereby the curtain airbag can be more securely prevented from coming into this gap.

In another embodiment of the present invention, the above-described each of the plural parts of the second guide part of the deployment guide portion is configured to extend from an inward end, in the vehicle width direction, of the bottom wall part to an outward end, in the vehicle width direction, of the bottom wall part.

According to this embodiment, the rigidity of the second guide part of the deployment guide portion can be increased. Further, since an inward end, in the vehicle width direction, of the second guide part and the inward end, in the vehicle width direction, of the bottom wall part of the first guide part are located substantially at the same position in the vehicle width direction, the curtain airbag can be effectively prevented from being deployed outwardly in the vehicle width direction below the first guide part, so that the curtain airbag can be more securely prevented from coming into the gap between the first guide part and the pillar trim.

In another embodiment of the present invention, each of the plural parts of the second guide part of the deployment guide portion is configured to extend downwardly from the vicinity of an inward end, in the vehicle width direction, of the bottom wall part.

According to this embodiment as well, the curtain airbag can be effectively prevented from being deployed outwardly in the vehicle width direction below the first guide part, so that the curtain airbag can be more securely prevented from coming into the gap between the first guide part and the pillar trim.

In another embodiment of the present invention, the deployment guide portion further comprises a connecting piece which extends outwardly, in the vehicle width direction, from a lower end portion of the above-described each of the plural parts of the second guide part, the connecting piece being connected to an outward end, in the vehicle width direction, of the bottom wall part.

According to this embodiment, the outward-side deployment of the curtain airbag can be also restrained by the second guide part having the appropriately-increased rigidity. Further, the gap between the first guide part and the pillar trim can be closed along the vehicle width direction with the connecting piece, whereby the curtain airbag can be more securely prevented from coming into this gap.

Other features, aspects, and advantages of the present invention will become apparent from the following description which refers to the accompanying drawings.

BRIEF DESCRIPTION OF THE DRAWINGS

FIG. 4 is a view showing a state where a pillar trim is removed from the state shown in

FIG. 3.

DETAILED DESCRIPTION OF THE INVENTION

Figure 1:
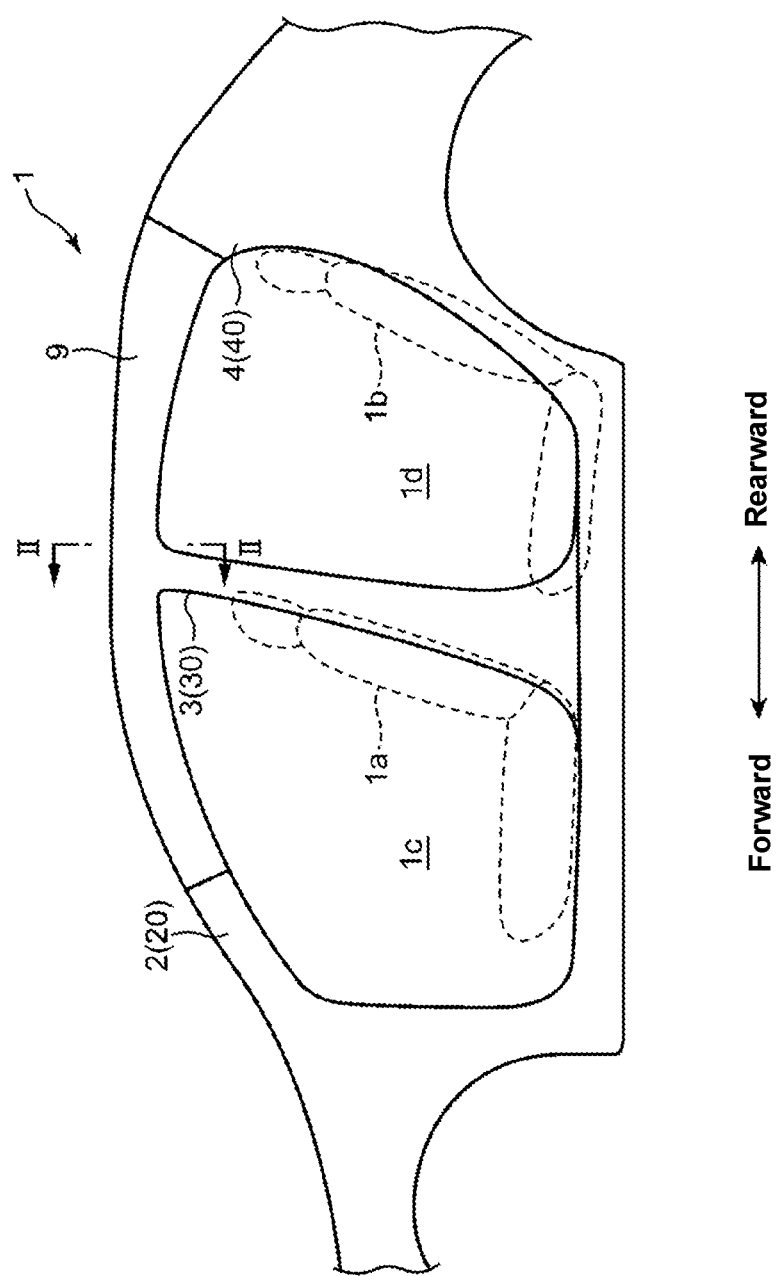
FIG. 1 is a schematic side view of a side part of a vehicle according to an embodiment of the present invention, when viewed from a side of a cabin.

Embodiments of the present invention will be specifically described referring to the drawings. Herein, a case where an upper interior structure of a vehicle according to the present invention is applied to a vehicle 1 which is provided with two-row seats comprising a first-row seat 1a and a second-row seat 1b as shown in FIG. 1 will be described.

Figure 2:
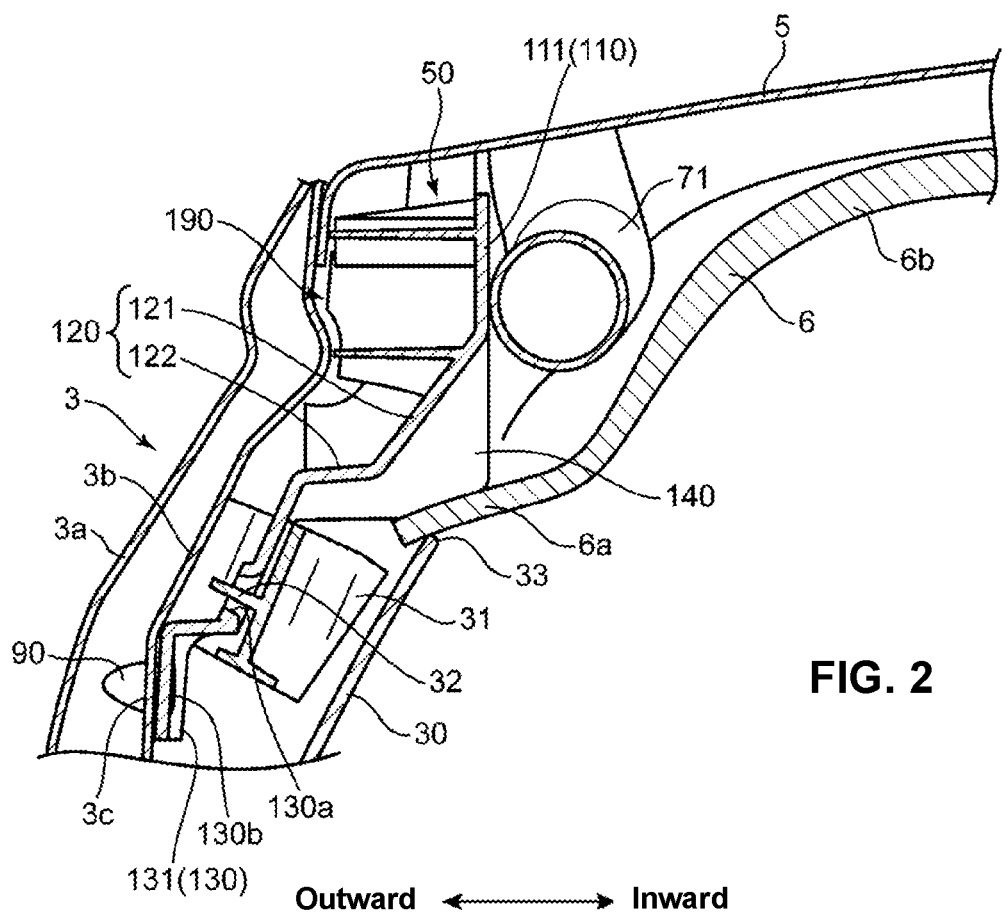
FIG. 2 is a schematic sectional view taken along line II-II of FIG. 1.

FIG. 1 is a schematic side view of a side part of the vehicle 1, when viewed from a side of a cabin. FIG. 2 is a schematic sectional view taken along line II-II of FIG. 1. In the following description, a vehicle longitudinal direction will be referred to as a longitudinal direction, simply. In respective figures, the term of "inward" means an inward side in a vehicle width direction, i.e., a side of a cabin, and a term of "outward" means an outward side in the vehicle width direction, i.e., an outside of a vehicle. As shown in FIG. 1, an opening portion 1c of passenger's ingress/egress for the first-row seat 1a and an opening portion 1d of passenger's ingress/egress for the second-row seat 1b are provided at a side part of the vehicle 1. A side door, not illustrated, is attached to each of these opening portions 1c, 1d. The vehicle 1 comprises an A pillar 2, a B pillar 3, and a C pillar 4 which are provided in order from the front as respective pillars partitioning the opening portions 1c, 1d. The vehicle 1 further comprises a roof panel 5 which constitutes an outer face of a ceiling part of the cabin. These pillars 2, 3, 4 are provided at both sides of the vehicle 1. Structures of these pillars themselves and their surround areas are symmetrical relative to the vehicle width direction.

As shown in FIGS. 1 and 2, the vehicle 1 comprises, as a vehicle interior member, a top ceiling 6 which covers a ceiling of the cabin by covering the roof panel 5 from below and pillar trims 20, 30, 40 which respectively cover the pillars 2, 3, 4 from the side of the cabin.

The top ceiling 6 is made of a soft material and thereby configured to be relatively easily deformable. The top ceiling 6 is formed by covering a surface of urethan foam or the like with nonwoven fabric, for example. The pillar trims 20, 30, 40 are made of hard synthetic resin (polypropylene, for example), respectively, and thereby configured not to be easily deformed plastically.

The top ceiling 6 comprises a body portion 6b which is configured in an arch shape to protrude upwardly in a vertical section and an extension portion 6a which extends roughly horizontally (i.e., in a horizontal direction) from an end portion, in the vehicle width direction, of the body portion 6b. That is, the extension portion 6a extending roughly horizontally is provided at each of both outer end portions, in the vehicle width direction, of the top ceiling 6. Herein, the extension portion 6a is configured such that its angle relative to a horizontal plane is 0 degree or larger and 20 degrees or smaller. Accordingly, "something extends roughly horizontally" means "something extends such that its angle relative to the horizontal plane is "0 degree or larger and 20 degrees or smaller" in this description (specification).

The vehicle 1 is provided with a bracket to hold the top ceiling 6 as an interior member of the vehicle. In the present embodiment, the vehicle 1 comprises a bracket 50 which is provided at an upper end portion of the B pillar 3 as this bracket. The bracket 50 corresponds to a "deployment guide portion" recited in the claims.

The vehicle 1 further comprises a curtain airbag device 70. The curtain airbag device 70 is a device to protect an occupant (passenger) in a vehicle collision. The curtain airbag device 70 comprises a bag-shaped curtain airbag 71 and an inflator 72 to supply expansion (inflatable) gas to the curtain airbag 71.

The curtain airbag 71 is stored above the top ceiling 6, i.e., in a space formed above the top ceiling 6, in its folded state. The curtain airbag 71 has the length from the A pillar 2 to the C pillar 4, and is configured to extend from an upper end portion of the A pillar 2 to an upper end portion of the C pillar 4 through an upper end portion of the B pillar 3.

The inflator 72 is configured to operate (work) when a vehicle side collision is detected by a side-collision sensor, not illustrated, which is made of a lateral G (gravity) sensor, for example, thereby supplying the expansion gas to the curtain airbag 71 instantly. The curtain airbag 71 expands when receiving the expansion gas and then is deployed below the top ceiling 6, i.e., in the cabin. The curtain airbag 71 is deployed so as to cover a cabin side wall which comprises an inner face of the side door and the like, thereby preventing a driver (occupant) from hitting against the cabin side wall.

A structure of a surrounding area of the pillar will be described. Herein, the structure of the surrounding area of the B pillar 3 will be described as an exemplified case where the pillar recited in the claims corresponds to the B pillar 3. Hereafter, the outward side in the vehicle width direction (i.e., the outside of the vehicle) will be referred to as a "vehicle outside," and the inward side in the vehicle width direction (i.e., the side of the cabin) will be referred to as a "cabin side" simply.

Figure 3:
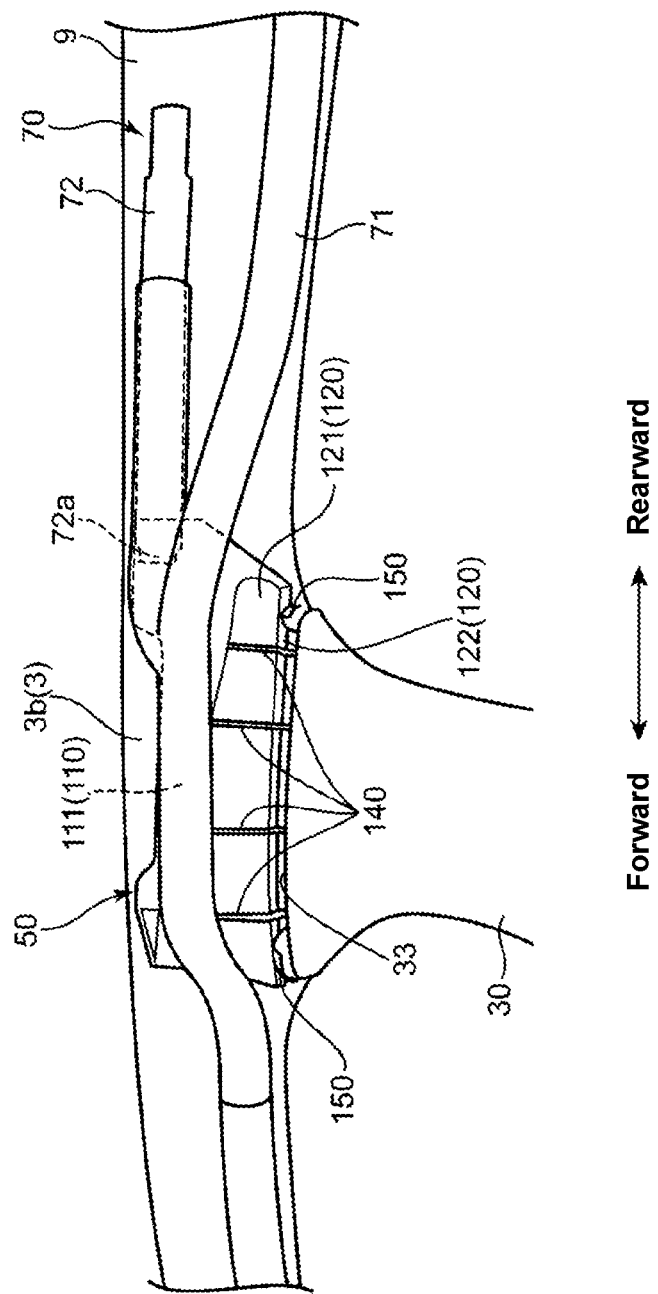
FIG. 3 is a schematic view of a surrounding area of a B pillar in a state where a top ceiling is removed, when viewed from the side of the cabin.
Figure 4:
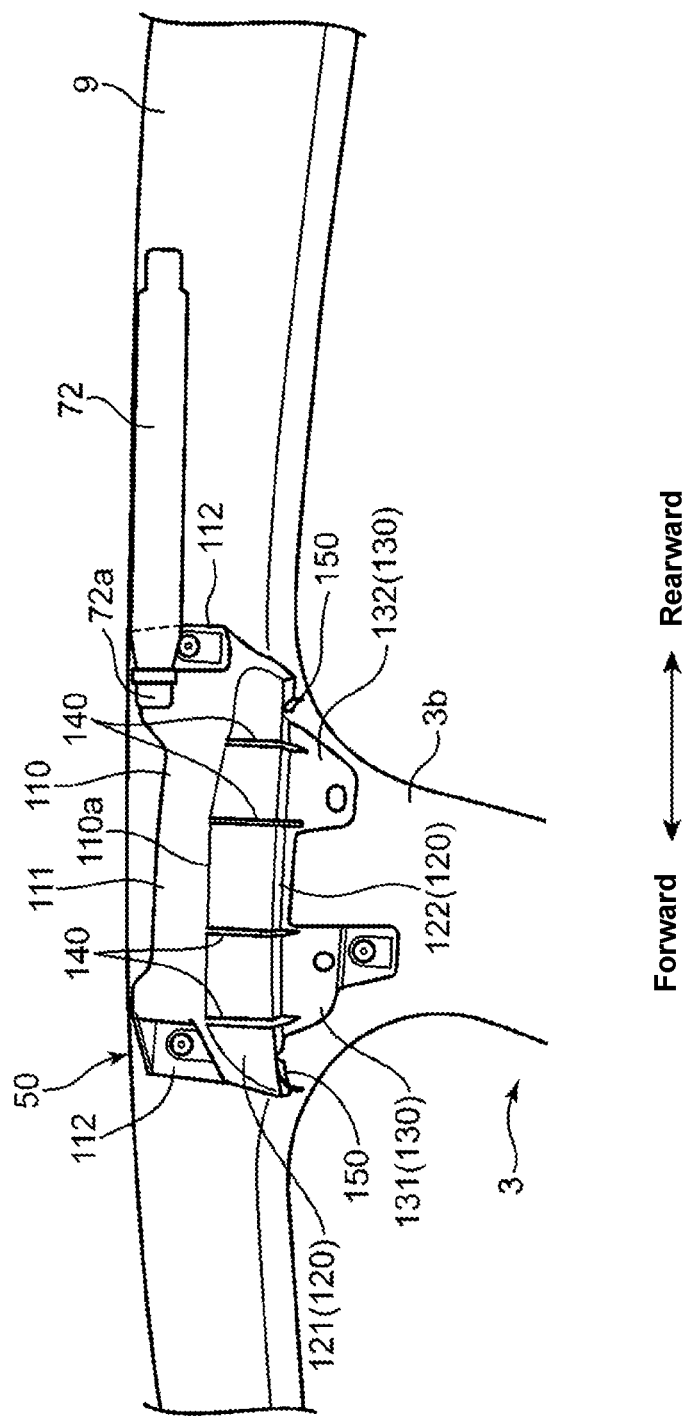
Figure 5:
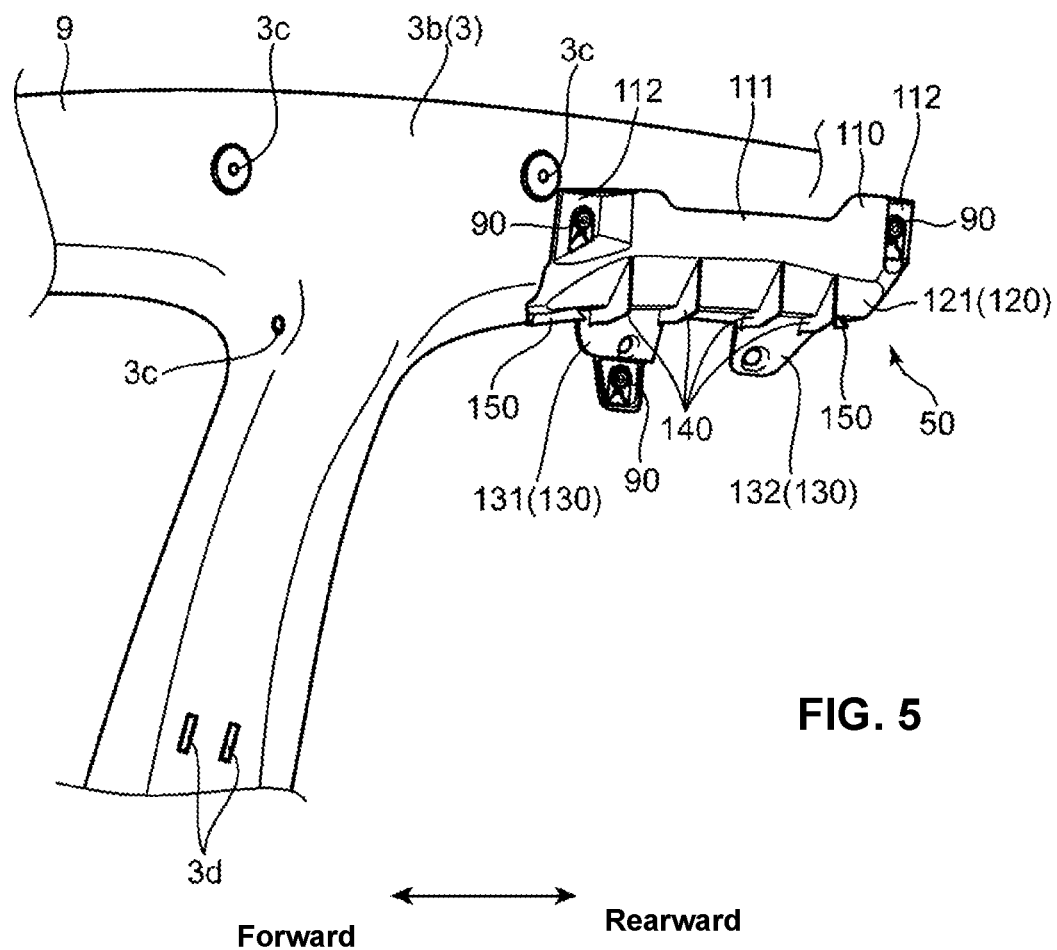
FIG. 5 is a schematic perspective view explaining an attachment structure of a bracket and a pillar inner, when viewed from the side of the cabin.
Figure 6:
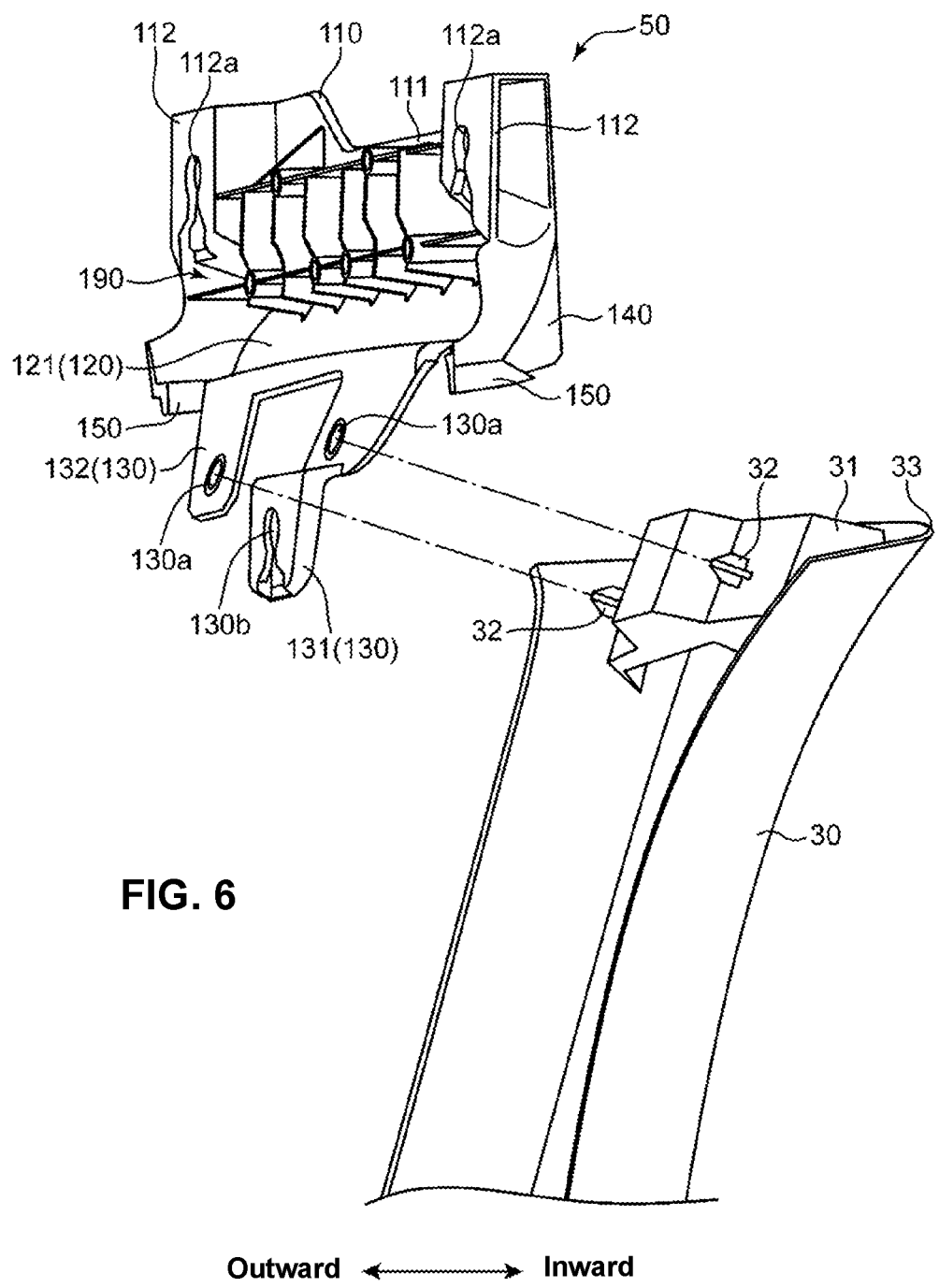
FIG. 6 is a schematic perspective view explaining an attachment structure of the bracket and the pillar trim, when viewed from the outward side of the vehicle.

FIG. 3 is a schematic view of a surrounding area of the upper end portion of the B pillar 3, when viewed from the cabin side, which shows a state where the top ceiling 6 is removed. FIG. 4 is a view showing a state where the pillar trim 30 and the curtain airbag 71 are removed from the state shown in FIG. 3. FIG. 5 is a schematic view explaining an attachment structure of the bracket 50 to the B pillar 3, when viewed from the cabin side. FIG. 6 is a schematic view explaining an attachment structure of the bracket 50 and the pillar trim 30, when viewed from the vehicle outside.

As shown in FIG. 2, the B pillar 3 comprises a pillar outer panel 3a which is arranged on the vehicle outside and a pillar inner panel 3b which is arranged on the cabin side and forms a closed cross section of the pillar with the pillar outer panel 3a. In the present embodiment, the pillar inner panel 3b of the B pillar 3 is formed integrally at a roof side rail 9 which extends rearwardly from the upper end portion of the A pillar 2. The pillar inner panel 3b of the B pillar 3 extends downwardly from a middle portion, in the longitudinal direction, of the roof side rail 9. Hereafter, the pillar inner panel 3b of the B pillar 3 will be referred to as the pillar inner panel 3b simply.

Bracket fixing holes 3c for fixing the bracket 50 are formed at an upper end portion of the pillar inner panel 3b. In the present embodiment, the two bracket fixing holes 3c are formed near an upper edge of the pillar inner panel 3b at respective positions which are spaced apart from each other in the longitudinal direction and located substantially at the same level, and the single bracket fixing hole 3c is formed at a lower level than the two bracket fixing holes 3c. Pillar-trim fixing holes 3d for fixing the pillar trim 30 are formed near a center, in a vertical direction, of the pillar inner panel 3b.

As shown in FIG. 6 and others, the pillar trim 30 is configured to protrude to the cabin side and has a roughly U-shaped horizontal cross section. The pillar trim 30 is fixed to the pillar inner panel 3a in a state where a lower portion of the bracket 50 is covered therewith from the cabin side.

A projection portion 31 which projects to the vehicle outside is provided at an upper portion of a vehicle-outside side face of the pillar trim 30. At this projection portion 31 are provided two projections for poisoning 32, 32 which further project to the vehicle outside at respective positions which are spaced apart from each other in the longitudinal direction.

Figure 7:
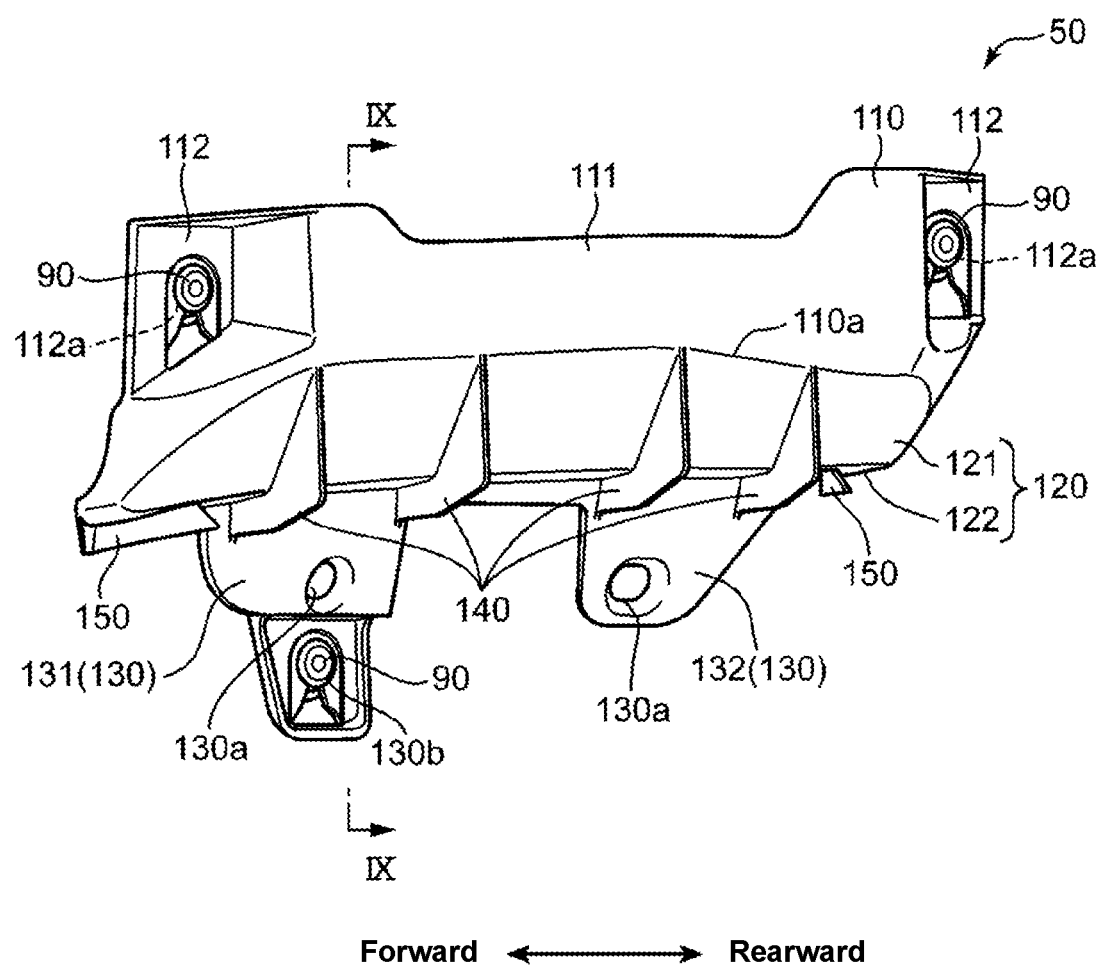
FIG. 7 is a schematic perspective view of the bracket, when viewed from the side of the cabin.
Figure 8:
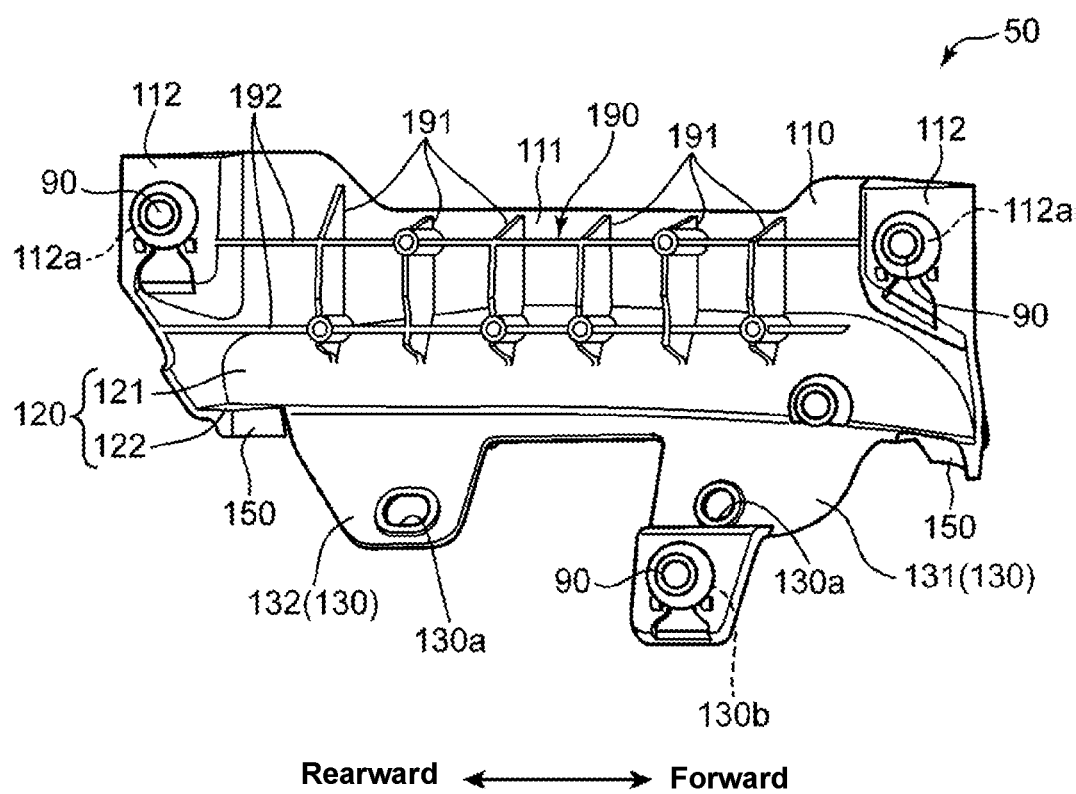
FIG. 8 is a schematic perspective view of the bracket, when viewed from the outward side of the vehicle.
Figure 9:
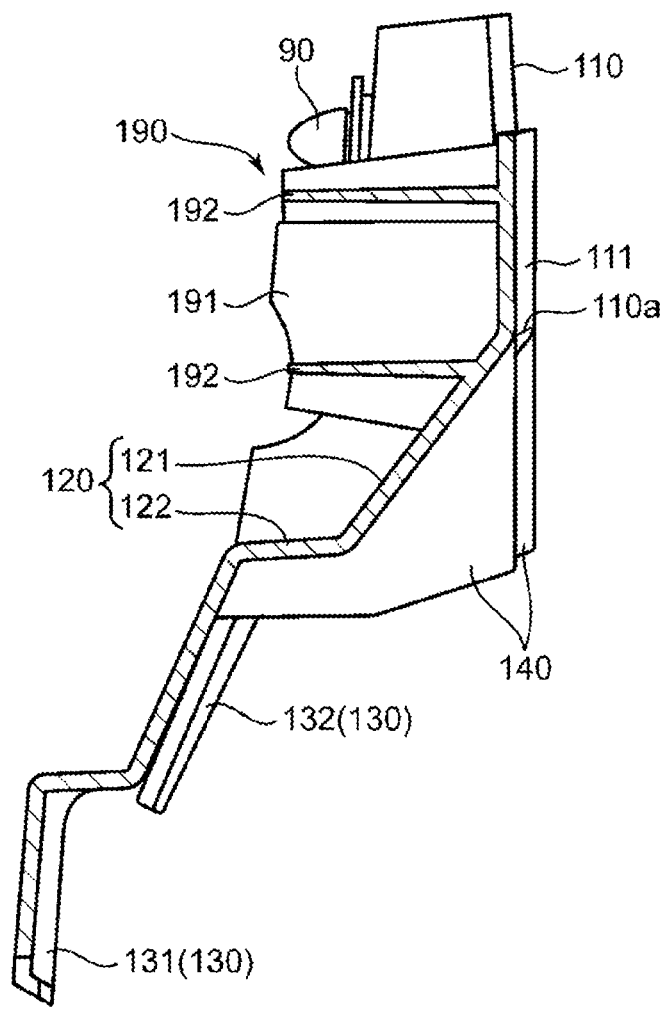
FIG. 9 is a schematic sectional view taken along line IX-IX of FIG. 7.

FIG. 7 is a schematic perspective view of the bracket 50, when viewed from the cabin side. FIG. 8 is a schematic perspective view of the bracket 50, when viewed from the vehicle outside. FIG. 9 is a schematic sectional view taken along line IX-IX of FIG. 7.

The bracket 50 is attached near the upper end portion of the pillar inner panel 3b. As described above, the lower portion of the bracket 50 is covered with the pillar trim 30, and the bracket 50 is large enough to extend from a position located below an upper edge 33 of the pillar trim 30 to another position located above the upper edge 33 of the pillar trim 30.

The bracket 50 comprises a first vertical wall part 110 which extends in the longitudinal direction and in the vertical direction, a bottom wall part 120 which extends to the vehicle outside from a lower edge 110a (lower end portion) of the first vertical wall part 110, a second vertical wall part 130 which extends downwardly from a vehicle-outside edge of the bottom wall part 120, a plurality of first holding pieces 140 which extend downwardly from a lower face of the bottom wall part 120, and two second holding pieces 150 which extend downwardly from the lower face of the bottom wall part 120. Herein, the first vertical wall part 110 corresponds to a "first guide part" recited in the claims, the bottom wall part 120 corresponds to a "bottom wall part" recited in the claims, and the first holding pieces 140 correspond to a "second guide part" recited in the claims.

Another part 111 except both-end portions of the first vertical wall part 110 (hereafter, referred to as the central panel part 111) extends in the vertical direction along a vertical face which is substantially perpendicular to the vehicle width direction. That is, the first vertical wall part 110 includes the central panel part 111 extending along the vertical face at a central portion, in the longitudinal direction, thereof.

The first vertical wall part 110 are curved such that the both-end portions, in the longitudinal direction, of the first vertical wall part 110 are positioned outwardly. A bracket fixed portion 112 which projects to the vehicle outside is provided at each of the both-end portions, in the longitudinal direction, of the first vertical wall part 110. A bracket fixed hole 112*a* which penetrates a vehicle-outside face and a cabin-side face of the bracket fixed portion 112 is formed at the bracket fixed portion 112. A clip 90 for fixing the bracket 50 to the pillar inner panel 3*b* is attached to the bracket fixed hole 112*a*.

The level (height position) of a lower edge of the central panel part 111 is roughly constant in the longitudinal direction. Meanwhile, a lower edge of an end portion of the first vertical part 110 which extends forwardly and rearwardly from the central panel part 111 is curved downwardly. That is, the lower edge 110*a* of the first vertical part 110 extends at the roughly constant level at the central portion, in the longitudinal direction, thereof, but is curved downwardly at each end portion, in the longitudinal direction, thereof, whereby the lower edge 110*a* of the first vertical part 110 is configured in an arc shape such that its central portion protrudes upwardly in a vehicle side view. Herein, each outermost portion, in the longitudinal direction, of the first vertical wall portion 110 extends in the vehicle width direction such that the level (height position) of its lower edge is roughly constant.

As shown in FIG. 8, a rib 190 which projects to the vehicle outside is provided at a vehicle-outside face of the first vertical wall part 110, and the first vertical wall part 110 is reinforced by the rib 190. That is, the rigidity of the first vertical wall part 110 is increased, and an upper part of the bracket 50 is formed as a high-rigidity portion by means of the rib 190 and the first vertical wall part 110. In the present embodiment, the rib 190 is configured to be lattice-like in the vehicle side view. Specifically, the rib 190 comprises plural vertical ribs 191 which extend in the vertical direction and two lateral ribs 192 which extend in the longitudinal direction in parallel to each other, crossing the plural vertical ribs 191. Most part of the rib 190 is provided at the vehicle-outside face of the central panel part 111 of the first vertical wall portion 110, whereby the rigidity of the central panel part 111 is increased particularly.

The bottom wall part 120 comprises a first bottom wall portion 121 which extends to vehicle outside from the lower edge 110*a* of the first vertical wall part 110 (specifically, from a lower edge of another portion of the first vertical wall part 110 except the outermost end portion, in the longitudinal direction, thereof) and a second bottom wall portion 122 which extends to the vehicle outside from an outward edge, in the vehicle width direction, of the first bottom wall portion 121.

The first bottom wall portion 121 is configured to extend obliquely outwardly-and-downwardly. The second bottom wall portion 122 extends roughly horizontally to the vehicle outside from the outward edge, in the vehicle width direction, of the first bottom wall portion 121, i.e., from a lower edge of the first bottom all portion 121. Both-end portions, in the longitudinal direction, of the second bottom wall portion 122 connect to the outermost end portions, in the longitudinal direction, of the first vertical wall part 110.

In the present embodiment, a part of the rib 190 is positioned at a vehicle-outside face of the first bottom wall portion 121 as well. Herein, the rib 190 is provided at a higher level than a central position, in the vertical direction, of the first bottom wall portion 121, and the rigidity of the bottom wall part 120 is configured to be lower than that of the first vertical wall portion 121.

The second vertical wall part 130 is configured to extend downwardly from an vehicle-outside edge of the second bottom wall portion 122. The second vertical wall portion 122 comprises a front-side second vertical wall portion 131 which is provided on the forward side and a rear-side second vertical wall portion 132 which is provided on the rearward side. The front-side second vertical wall portion 131 extends downwardly beyond the rear-side second vertical wall portion 132. Each of the front-side second vertical wall portion 131 and the rear-side second vertical wall portion 132 has a positioning hole 130*a* which penetrates a vehicle-outside face and a cabin-side face of each of these portions 131, 132.

The positioning hole 130*a* is a hole for regulating a relative position of the bracket 50 and the pillar trim 30. Specifically, as shown in FIG. 6, projections 32, 32 for positioning the pillar trim 30 are inserted into the positioning holes 130*a*, 130*a*. The outer diameter of the projection 32 is set to be roughly equal to the inner diameter of the poisoning hole 130*a*, and the pillar trim 30 is engaged with the bracket 50 by inserting the projections 32, 32 into the positioning holes 130*a*, 130*a*, whereby the position of the pillar trim 30 relative to the bracket 50 is regulated.

A bracket fixed hole 130*b* is formed at a portion of the front-side second vertical wall portion 131 which is located at a lower level than the positioning hole 130*a*. The clip 90 for fixing the bracket 50 to the pillar inner panel 3*b* is attached to the bracket fixed hole 130*b* similarly to the bracket fixed hole 112*a* provided at the first vertical wall part 110.

Each of the first holding pieces 140 is configured in a plate shape to extend in the vertical direction and in the vehicle width direction, that is, is of the plate shape having a face perpendicular to the vehicle longitudinal direction. In the present embodiment, the four first holding pieces 140 are provided at the single bracket 50. The four first holding pieces 140 are configured to have the same structure. These pieces 140 are arranged in parallel to each other at respective positions which are spaced apart from each other in the longitudinal direction. In the present embodiment, all of these pieces 140 are provided in an area, in the longitudinal direction, where the central panel part 111 is provided at the first vertical wall part 110 and arranged below the central panel part 111.

Each of the first holding pieces 140 extends over the first bottom wall portion 121 and the second bottom wall portion 122, which extends downwardly from the respective lower faces of these bottom wall portions 121, 122. The first holding piece 140 connects to a cabin-side face of the second vertical wall part 130 and extends to the cabin side from this cabin-side face of the second vertical wall part 130. The first holding piece 140 extends to substantially the same position, in the vehicle width direction, as a cabin-side end face of the central panel part 111. An inward end, in the vehicle width direction, of the first holding piece 140 extends substantially straightly in the vertical direction substantially at the same position (in the vehicle width direction) as the cabin-side end face of the central panel part 111, and the cabin-side end face of the central panel part 111 and the cabin-side end face of the first holding piece 140 extend in the vertical direction substantially continuously.

The height dimension of a vehicle-outside portion of the first holding piece 140 which extends downwardly from the second bottom wall portion 122 is roughly constant in the vehicle width direction, and the height position of a lower edge of this vehicle-outside portion of the first holding piece 140 is roughly constant in the vehicle width direction. Meanwhile, a cabin-side portion of the first holding piece 140 which extends downwardly from the first bottom wall portion 121 is configured to extend obliquely inwardly-and-upwardly such that its cabin-side lower edge is positioned upwardly as it goes inwardly.

The second holding pieces 150 are provided at a front end portion and a rear end portion of the second bottom wall portion 122, which comprise a front-side part which is positioned on the forward side of the foremost first holding piece 140 and a rear-side part which is positioned on the rearward side of the rearmost first holding piece 140. The second holding pieces 150 extend downwardly from the lower face of the second bottom wall portion 122. Each of the second holding pieces 150 is configured in the plate shape to extend in the vertical direction and in the vehicle width direction similarly to the first holding piece 140, but it is configured to be curved in the vehicle width direction. Specifically, the front-side second holding piece 150 is curved such that its forward side is positioned on the vehicle outside, whereas the rear-side second holding piece 150 is curved such that its rearward side is positioned on the vehicle outside.

As shown in FIGS. 2 and 5, the first holding pieces 140 and the second holding pieces 150 are positioned above the upper edge 33 of the pillar trim 30 and face this upper edge 33 in a state where the bracket 50 and the pillar trim 30 are attached to the pillar inner panel 3b. Specifically, the cabin-side portion extending obliquely inwardly-and-upwardly of each of the first holding pieces 140 and the upper edge 33 of the pillar trim 30 face each other in the vertical direction, and the second holding pieces 150 face both-side end portions, in the longitudinal direction, of upper edge 33 of the pillar trim 30 over the whole length of the second holding pieces 150. A gap is formed, in the vertical direction, between the respective holding pieces 140, 150 and the upper edge 33 of the pillar trim 30. The top ceiling 6 is arranged in the gap between the holding pieces 140, 150 and the upper edge 33 of the pillar trim 30 and held by the holding pieces 140, 150 and the pillar trim 30. More specifically, the top ceiling 6 is held between and by the lower edges of the holding pieces 140, 150 and the upper edge 33 of the pillar trim 30.

Hereafter, steps of attaching the bracket 50 and the pillar trim 30 to the pillar inner panel 3b will be described.

First, the clips 90 are attached to the bracket 50. Specifically, the clips 90 are inserted into the bracket fixed holes 112a, 112a, 130b of the bracket 50. The clips 90 are configured such that respective tip portions (respective portions provided on the vehicle outside) thereof are elastically deformable in a radial direction and these respective tip portions are inserted into the respective holes 112a, 112a, 130b in a reduced-diameter state and then expanded to an increased-diameter state, whereby the clips 90 are attached to the bracket 50.

Next, the bracket 50 is attached to the pillar inner panel 3b via the clips 90. Specifically, respective portions of the clips 90 which project to the vehicle outside from the bracket 50 are inserted into the bracket fixing holes 3c of the pillar inner panel 3b. Herein, the clips 90 are fixed to the pillar inner panel 3b through the above-described changing of each diameter of the respective tip portions of the clips 90. Thereby, the bracket 50 is fixed to the pillar inner panel 3b.

In the present embodiment, the bracket 50 is fixed to the pillar inner panel 3b such that it is unable to move relatively, in the vehicle width direction, to the pillar inner panel 3b. Meanwhile, the bracket 50 is fixed to the pillar inner panel 3b such that it is movable to a certain degree in the radial direction of the clips 90, i.e., in a direction along the cabin-side side face of the pillar inner panel 3b. Specifically, the respective outer diameters of the portions of the clips 90 which are inserted into the bracket fixed holes 112a, 112a, 130b are set to be smaller than the respective inner diameters of the bracket fixed holes 112a, 112a, 130b, so that each of the clips 90 is attached to the bracket 50 so as to move relatively along a face perpendicular to an axial direction of the clip 90. Meanwhile, the respective outer diameters of the portions of the clips 90 which are inserted into the bracket fixing holes 3c are set to be substantially equal to the respective inner diameters of the bracket fixing holes 3c, so that the clips 90 are configured such that their axial-directional moves are restricted in a state where the clips 90 are inserted into the bracket fixed holes 112a, 112a, 130b and the bracket fixing holes 3c. Thereby, the bracket 50 is attached such that the relative move, in the vehicle width direction, thereof to the clips 90 and thereby the pillar inner panel 3b is restricted, whereas the relative move thereof along the cabin-side side face of the pillar inner panel 3b is allowed.

Next, the pillar trim 30 is attached to the pillar inner panel 3b, interposing an end portion, in the vehicle width direction, of the top ceiling 6 between the pillar trim 30 and the bracket 50. At this time, as show in FIG. 6 and as described above, the projections 32, 32 for positioning of the pillar trim 30 are inserted into the positioning holes 130a, 130a, thereby engaging the pillar trim 30 with the bracket 50. Then, clips (not illustrated) provided at the pillar trim 40 are inserted into the pillar-trim fixing holes 3d of the pillar inner panel 3b, thereby fixing the pillar trim 30 to the pillar inner panel 3b.

Thereby, the pillar trim 30 is attached such that the lower portion of the bracket 50 and the pillar inner panel 3b are covered therewith from the cabin side in a state where the relative position of the bracket 50 to the pillar trim 30 is properly maintained. Further, the top ceiling 6 is held above the pillar trim 30 by the pillar trim 30 and the bracket 50. Specifically, as described above, the top ceiling 6 is held between and by the upper edge 33 of the pillar trim 30 and respective lower edges of the first and second holding pieces 140, 150 in a state where the top ceiling 6 contacts the upper edge 33 of the pillar trim 30. Thus, the bracket 50 is entirely covered with the pillar trim 30 and the top ceiling 6 from the cabin side.

Herein, as described above, the extension portion 6a is provided at the end portion, in the vehicle width direction, of the top ceiling 6. Thus, this extension portion 6a of the top ceiling 6 is held between and by the pillar trim 30 and the bracket 50.

As described above, in the present embodiment, the top ceiling 6 can be held above the pillar trim 30 by holing the top ceiling 6 between the bracket 50 (the first holding pieces 140, the second holding pieces 150) and the upper edge 33 of the pillar trim 30, thereby facilitating attachment of the top ceiling 6. Next, a positional relationship between the curtain airbag device 70 and the bracket 50, the pillar trim 30 and the top ceiling 6 which are attached to the pillar inner panel 3b as described above will be described.

As shown in FIGS. 2, 3 and others, the curtain airbag 71 is arranged on the cabin side of the bracket 50. The curtain airbag 71 extends in the longitudinal direction through a space between the bracket 50 and the top ceiling 6. The bracket 50 and the pillar trim 30 hold a vehicle-outside portion of the extension portion 6a, and a part of the extension portion 6a extends to the cabin side from the bracket 50 and the upper edge 33 of the pillar trim 30. The curtain airbag 71 is arranged above this part of the extension portion 6a, i.e., the vehicle-outside portion of the extension portion 6a. The curtain airbag 71 is arranged at a position which is upwardly spaced apart from the extension portion 6a, and a space is formed between the curtain airbag 71 and the extension portion 6a.

The curtain airbag 71 is provided such that at least a part thereof faces the first vertical wall part 110, and the curtain airbag 71 extends in the longitudinal direction, passing on the cabin side of the first vertical wall part 110. Specifically, the curtain airbag 71 extends in the longitudinal direction along a cabin-side face of the central panel part 111 of the first vertical wall part 110. In the present embodiment, the curtain airbag 71 is located in a range, in the vertical direction, from a position below the upper edge of the first vertical wall part 110 to another position below the lower edge 110a of the first vertical wall part 110. In an example shown in FIG. 2, the curtain airbag 71 is located in a range, in the vertical direction, from a position which is lower than the upper edge of the first vertical wall part 110 by about ⅓ of the height dimension of the first vertical wall part 110 to another position which is lower than the upper edge of the first holding piece 140 by about ¼ of the maximum height dimension of the first holding piece 140. Further, an upper part of the curtain airbag 71 which is located at an about ¾ position from the top is arranged above the lower edge 110a of the first vertical wall part 110.

As shown in FIGS. 3 and 4, the inflator 72 is formed in a cylindrical shape and has a gas supply portion 72a where gas is ejected toward the curtain airbag 71 at one end, in its longitudinal direction, thereof. The inflator 72 is provided on the cabin side, in the vehicle width direction, of the bracket 50 and extends rearwardly from a position which faces an upper end portion of a rear end portion of the bracket 50 in a state where the gas supply portion 72a is directed forwardly. That is, the inflator 72 extends in the longitudinal direction and is attached so as to be located above the top ceiling 6 in a state where the gas supply portion 72a is positioned at its front end. The gas supply portion 72a of the inflator 72 is arranged at a position which overlaps a rear end portion of the bracket 50 in the vehicle side view. The curtain airbag 71 is configured such that it extends forwardly from the gas supply portion 72a and then branches off forwardly and rearwardly at a branch portion 71a.

As shown in FIG. 2 and others, the curtain airbag 71 is arranged on the cabin side of the upper edge 33 of the pillar trim 30. Herein, the pillar trim 30 is configured such that it is upwardly curved to the cabin side and its upper edge 33 is positioned on the cabin side the most. Accordingly, the curtain airbag 71 is positioned on the cabin side, in the vehicle width direction, of any part of the pillar trim 30.

Figure 10A:
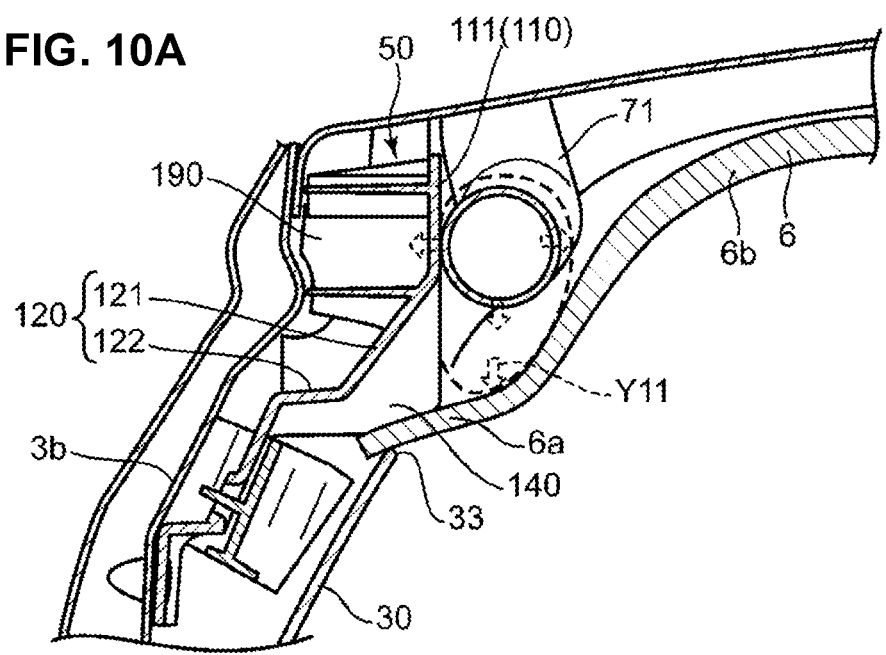
FIG. 10A is a view showing a deployment state of a curtain airbag before the top ceiling is detached.
Figure 10B:
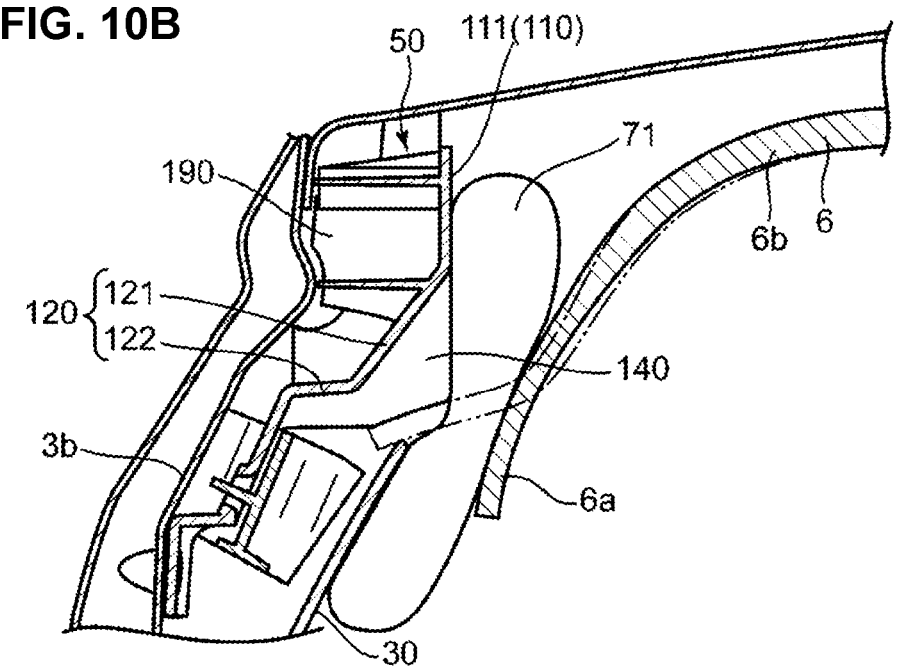
FIG. 10B is a view showing a deployment state of the curtain airbag after the top ceiling is detached.

FIGS. 10A and 10B are views showing deployment states of the curtain airbag 71.

When the vehicle has a side collision or the like, the gas is supplied to the curtain airbag 71 from the gas supply portion 72a of the inflator 72. The curtain airbag 71 is going to expand downwardly, to the cabin side, and to the vehicle outside as shown by arrows. Herein, the curtain airbag 71 is provided to face the first vertical wall part 110 as described above. Therefore, the expansion of the curtain airbag 71 to the vehicle outside is restrained by the first vertical wall part 110, and the curtain airbag 71 is guided downwardly and to the cabin side by the first vertical wall part 110. Particularly, the rigidity of the first vertical wall part 110 is set to be properly high in the present embodiment. Accordingly, the amount of move of the first vertical wall part 110 to the vehicle outside is so restrained that the amount of expansion of the curtain airbag 71 to the vehicle outside is restrained to a considerably-small amount of expansion. Further, since the curtain airbag 71 is arranged along the central panel part 111 configured to have the highest rigidity in the first vertical wall part 110 in the present embodiment, the expansion of the curtain airbag 71 to the vehicle outside is restrained more securely. Moreover, the central panel part 111 extends along the vertical face, so that the curtain airbag 71 is guided downwardly smoothly along the central panel part 111.

The curtain airbag 71 is going to expand to the vehicle outside at the position located below the first vertical wall part 110 as well. However, the first holding pieces 140 are arranged in line in the longitudinal direction between the lower edge 110a of the first vertical wall part 110 and the top ceiling 6. Therefore, the expansion of the curtain airbag 71 to the vehicle outside is restrained by the first holding pieces 140 at the position located below the first vertical wall part 110. That is, the curtain airbag 71 is guided downwardly and to the cabin side by the first holding pieces 140 as well. In the present embodiment, each of the first holding pieces 140 is configured to extend in the vehicle width direction. Further, the first holding piece 140 is configured to connect to the second vertical wall part 130 and the bottom wall part 120. Accordingly, the rigidity of the first holding piece 140 is set to be properly high even though that is lower than the rigidity of the first vertical wall part 110. Thereby, the expansion of the curtain airbag 71 to the vehicle outside is restrained by the first holding pieces 140 as well.

If the first holding pieces 140 are not provided, there occurs a relatively large gap expanding in the longitudinal direction between the first vertical wall part 110 and the pillar trim 30, so that there is a concern that the curtain airbag 71 may come into this gap and be caught by the upper edge 33 or the like of the pillar trim 30. According to the present embodiment, however, it is restrained by the first holding pieces 140 that the curtain airbag 71 comes into a space positioned on the vehicle outside of the pillar trim 30, whereby it is restrained that the curtain airbag 71 is caught by the upper edge 33 or the like of the pillar trim 30.

As shown by a broken line in FIG. 10A, the curtain airbag 71 expanding downwardly hits against the to top ceiling 6. Herein, the curtain airbag 71 is arranged above the extension portion 6a of the top ceiling 6 as described above. Therefore, the curtain airbag 71 hits against the extension portion 6a primarily. The extension portion 6a extends roughly horizontally. Accordingly, the direction of a force applied from the curtain airbag 71 expanding downwardly to the extension portion 6a is substantially perpendicular to the extension portion 6a as shown by an arrow Y11, so that an expansion force of the curtain airbag 71 is effectively applied to the extension portion 6a. Further, the curtain airbag 71 is arranged at a position which is upwardly spaced apart from the extension portion 6a in a state where the curtain airbag 71 does not expand yet. Therefore, the downward speed of the expansion of the curtain airbag 71 becomes relatively high at the timing the curtain airbag 71 hits against the extension portion 6a. Thus, the curtain airbag 71 hits against the extension portion 6a powerfully, so that the large downward force is applied to the extension portion 6a more securely. As shown in FIG. 10B, the extension portion 6a comes off downwardly from the gap between the bracket 50 and the pillar trim 30 when receiving the downward force from the curtain airbag 71. Thus, the extension portion 6a is made to come off from the gap between the bracket 50 and the pillar trim 30 by applying the large downward force to the extension portion 6a as described above.

A part of the curtain airbag 71 which connects to the gas supply portion 72a expands with a relatively large expansion force because the high-pressure gas is applied there promptly. Herein, since the gas supply portion 72a and the bracket 50 are provided to face each other in the present embodiment, the expansion force at a part of the curtain airbag which faces the bracket 50 becomes large. Thereby, according to the present embodiment, the large force can be applied to the portion of the top ceiling 6 which is held by the bracket 50, i.e., the extension portion 6a, from the curtain airbag 71 more securely, so that the top ceiling 6 can be made to come off from the gap between the bracket 50 and the pillar trim 30 more promptly.

When the extension portion 6a comes off from the gap between the bracket 50 and the pillar trim 30, the curtain airbag 71 comes out to the cabin side from the gap between the extension portion 6a and the pillar trim 30 and is deployed along the side wall of the vehicle. The curtain airbag 71 is arranged on the cabin-side, in the vehicle width direction, of the pillar trim 30 as described above. Accordingly, the curtain airbag 71 is promptly deployed into an area below the upper edge 33 of the pillar trim 30, without interfering with the pillar trim 30.

As described above, in the present embodiment, the bracket 50 is provided as the interior member of the vehicle, and this bracket 50 is provided with the first vertical wall part 110 which is arranged above the top ceiling 6 and on the outward side, in the vehicle width direction, of the curtain airbag 71, facing the upper edge 33 (the upper end portion) of the pillar trim 30, so as to restrain the deployment of the curtain airbag 71 to the vehicle outside and the first holding species 140 which extend from the first vertical wall part 110 to the upper face of the top ceiling 6 so as to restrain the curtain airbag 71 from coming into the gap between the first vertical wall part 110 and the upper edge 33 of the pillar trim 30. Accordingly, the deployment of the curtain airbag 71 to the cabin side can be promoted by the first vertical wall part 110, and also it can be properly restrained by the first holding pieces 140 that the curtain airbag 71 comes into the gap between the first vertical wall part 110 and the pillar trim 30 and thereby is caught by the pillar trim 30 or other parts provided on the vehicle outside of the pillar trim 30. Therefore, it is unnecessary that the shape of the pillar trim 30 is limited to the one for avoiding the catch of the curtain airbag 71, so that the curtain airbag 71 can be promptly deployed in the cabin, improving the design flexibility of the pillar trim 30 and thereby the design flexibility of the interior of the vehicle. Further, the deployment of the curtain airbag 71 to the cabin side can be promoted by the first holding pieces 140 as well as described above.

Further, in the present embodiment, the first vertical wall part 110 is configured to extend in the vehicle longitudinal direction and in the vertical direction, and the bottom wall part 120 is configured to extend to the vehicle outside from the lower edge 110a of the first vertical wall part 110. Accordingly, the rigidity of the first vertical wall part 110 is so increased that the deployment of the curtain airbag 71 to the vehicle outside can be restrained more securely by the first vertical wall part 110. Moreover, in the present embodiment, the first vertical wall part 110 is reinforced by the ribs 190. Particularly, the rigidity of the central panel part 111 of the first vertical wall part 110 along which the curtain airbag 71 is arranged is increased by the ribs 190. Also, the central panel part 111 is arranged along the vertical face of the central panel part 111. Accordingly, the deployment of the curtain airbag 71 to the vehicle outside can be restrained more securely by the central panel part 111, and the downward deployment of the curtain airbag 71 can be more promoted.

While the first holding pieces 140 are located below the first vertical wall part 110 and receives the relatively-low force applied from the curtain airbag 71 and a primary function of the first holding pieces 140 is to restrain the curtain airbag 71 from coming into the gap between the first vertical wall part 110 and the pillar trim 30, the rigidity of these first holding pieces 140 may be relatively low. In this embodiment, meanwhile, the plural first holding pieces 140 are provided at the lower face of the bottom wall part 120 such that these pieces 140 are spaced apart from each other in the longitudinal direction. That is, the first holding pieces 140 are distributed on the bottom wall part 120, not provided at a whole area, in the longitudinal direction, of the bottom wall part 120. Accordingly, the entire weight of the bracket 50 can be made properly light, retraining the curtain airbag 71 from coming into the gap between the first vertical wall part 110 and the pillar trim 30 and also retraining the vehicle-outside expansion of the curtain airbag 71 to a certain degree by means of the first holding pieces 140.

Herein, in the present embodiment, each of the first holding pieces 140 is of the plate shape extending in the vehicle width direction (having the face substantially perpendicular to the vehicle longitudinal direction). Thereby, the rigidity of the first holding pieces 140 can be relatively high, so that the deployment of the curtain airbag to the vehicle outside can be restrained more properly by the first holding pieces 140. Further, the gap between the first vertical wall part 110 and the pillar trim 30 can be closed along the vehicle width direction with the first holding pieces 140, whereby the curtain airbag 71 can be more securely prevented from coming into this gap.

Moreover, in the present embodiment, the first holding pieces 140 are configured to extend from around the cabin-side end portion of the bottom wall part 120 to the vehicle outside, and the cabin-side edges (end faces) of the first holding pieces 140 extend downwardly along the cabin-side end face of the first vertical wall part 110. Accordingly, the curtain airbag 71 can be effectively prevented from being deployed to the vehicle outside below the first vertical wall part 110, so that the curtain airbag 71 can be more securely prevented from coming into the gap between the first vertical wall part 110 and the pillar trim 30.

While the above-described embodiment explains the case where the curtain airbag 71 is arranged over the area from the first vertical wall part 110 to the first holding pieces 140 and a part which extends downwardly from the curtain airbag 71 to the top ceiling 6 is the lower portions of the first holding pieces 140 in the side view, the curtain airbag 71 may be arranged above the first holding pieces 140 and the entire part of the first holding pieces 140 or the entire part of the holding pieces 140 and the lower portion of the first vertical wall part 110 may be positioned below the curtain airbag 71.

Figure 11:
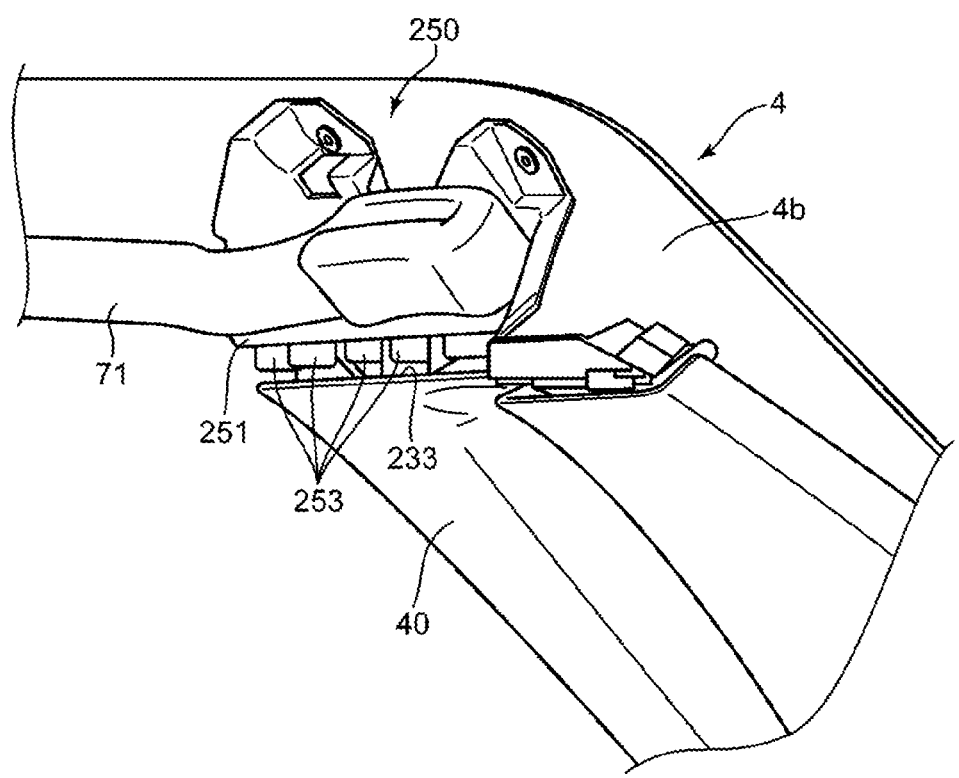
FIG. 11 is a schematic view of a surrounding area of a C pillar, when viewed from the side of the cabin.
Figure 12:
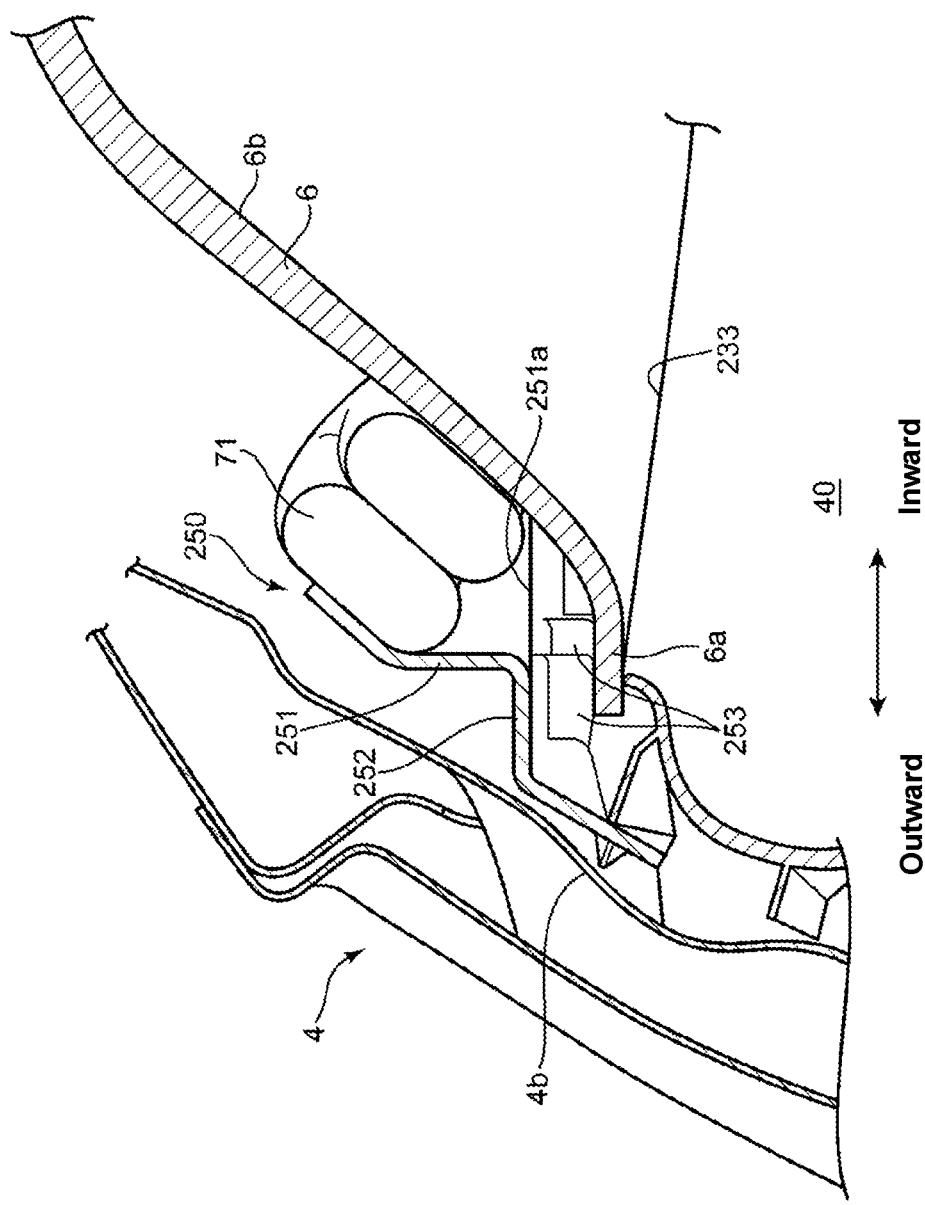
FIG. 12 is a schematic sectional view taken along line XII-XII of FIG. 11.

The above-described upper interior structure of the vehicle may be applied to a surrounding area of any other pillar than the B pillar 3. FIG. 11 is a schematic view of a surrounding area of the C pillar 4, when viewed from the cabin side, in a case where the above-described interior structure is applied to the surrounding area of the C pillar 4. FIG. 12 is a schematic sectional view taken along line XII-XII of FIG. 11.

In the example shown in FIGS. 11 and 12, a bracket 250 (hereafter, referred to as the C pillar bracket 250) is attached to a pillar inner panel 4b of the C pillar 4 (hereafter, referred to as the C pillar inner panel 4b). The C pillar bracket 250 comprises a first vertical wall part 251 which extends in the vertical direction, a bottom wall part 252 which extends to the vehicle outside from a lower edge 251a of the first wall part 251, and plural first holding pieces 253 which extend downwardly from a lower face of the bottom wall part 252, similarly to the above-described bracket 50 provided at the B pillar 3. The first holding pieces 253 are arranged parallelly in line in the longitudinal direction similarly to the above-described bracket 50. Further, this example is also configured such that the vehicle-outside portion of the extension portion 6a of the top ceiling 6 is held between an upper edge 233 of the pillar trim 40 covering the C pillar 4 from the cabin side and the bracket 250, and the curtain airbag 71 is stored above the cabin-side portion of the extension portion 6a, whereby the top ceiling 6 can be easily attached to the vehicle. Further, the deployment of the curtain airbag 71 to the vehicle outside can be prevented and the deployment of the curtain airbag 71 to the cabin side can be promoted by means of the first vertical wall part 251 and the first holding pieces 253. Moreover, the curtain airbag 71's coming into a gap between the first vertical wall part 251 and the upper edge 233 of the pillar trim 40 can be prevented by means of the first holding pieces 253.

Figure 13:
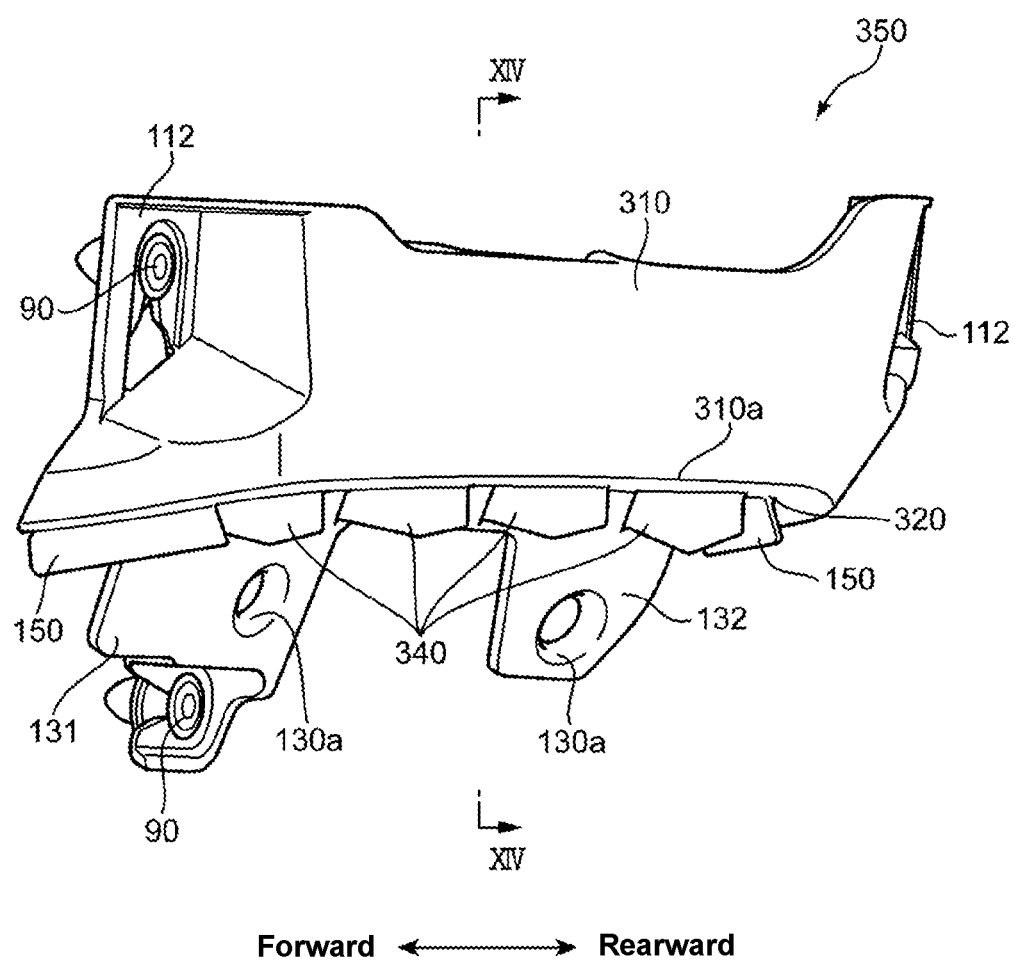
FIG. 13 is a schematic perspective view of a bracket according to a second embodiment.
Figure 14:
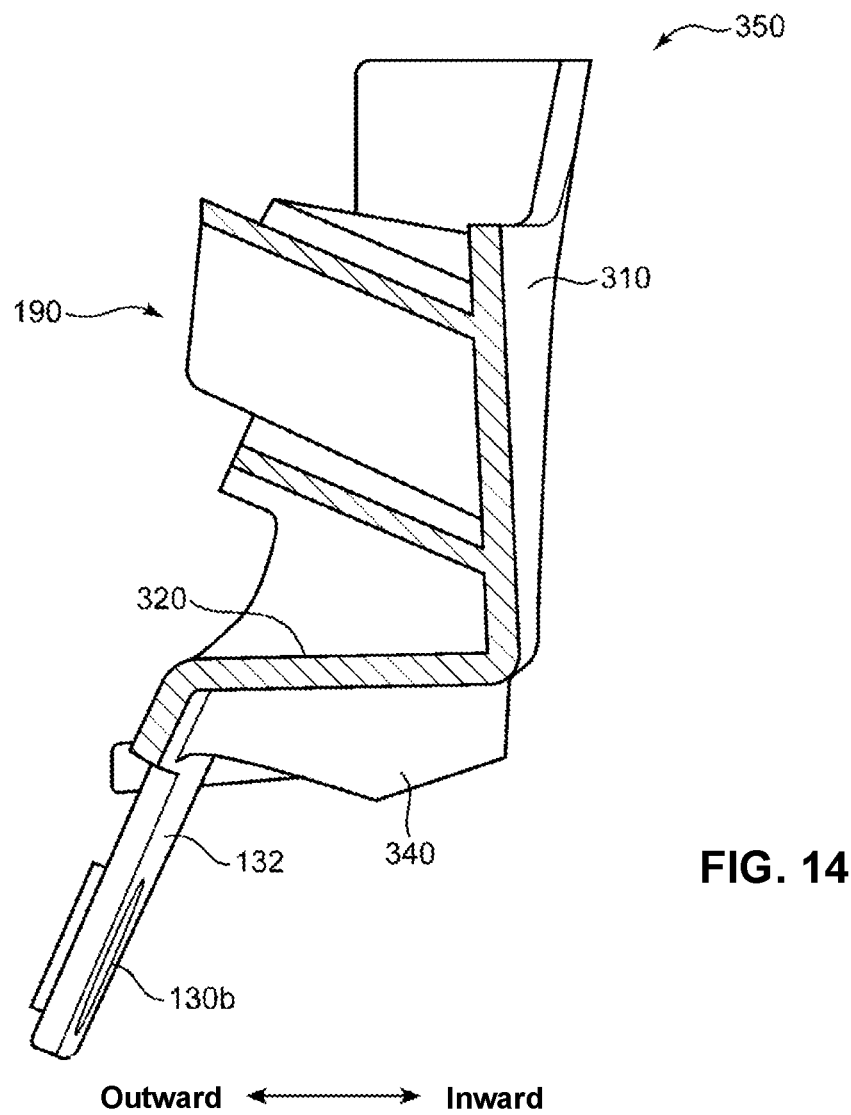
FIG. 14 is a schematic sectional view taken along line XIV-XIV of FIG. 13.

While the above-described embodiment explains the case where the lower edge 110a of the first vertical wall part 110 of the bracket 50 extends in the longitudinal direction such that the center, in the longitudinal direction, thereof protrudes upwardly, a bracket 350 shown in FIGS. 13 and 14 (which is a schematic sectional view taken along line XIV-XIV of FIG. 13) may be used instead.

Specifically, the bracket 350 according to a second embodiment shown in FIGS. 13 and 14 is configured such that the level (height position) of a lower edge 310a of a first vertical wall part 310 is constant over its entire range, and an entire part of a bottom wall part 320 which extends to the vehicle outside from the lower edge 310a of the first vertical wall part 310 extends roughly horizontally to the vehicle outside from the lower edge 310a of the first vertical wall part 310. Further, first holding pieces 340 extend downwardly from a lower face of the bottom wall part 320, and the height dimension of the first holding piece 340 is roughly constant in the vehicle width direction. In FIGS. 13 and 14, members which have the same structure as the above-described bracket 50 shown in FIG. 7 and others are denoted by the same reference characters.

Figure 15:
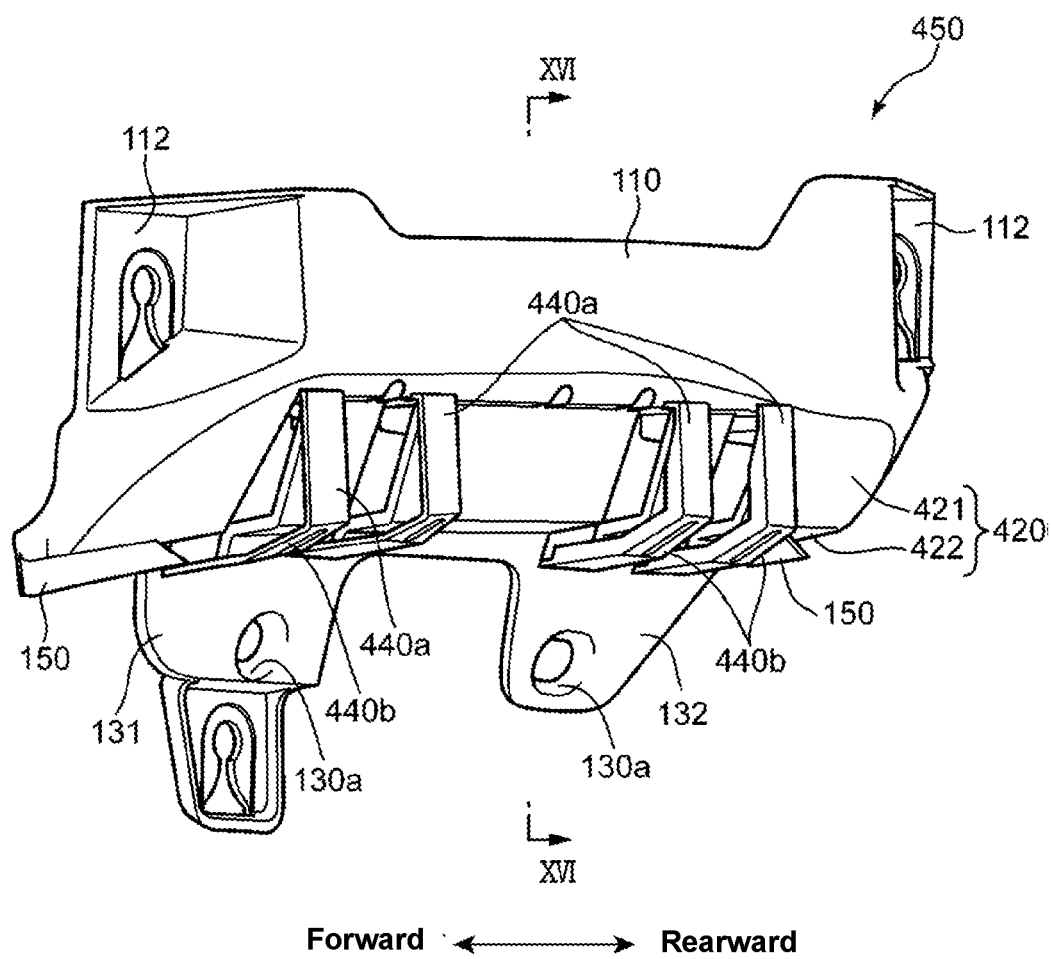
FIG. 15 is a schematic perspective view of a bracket according to a third embodiment.
Figure 16:
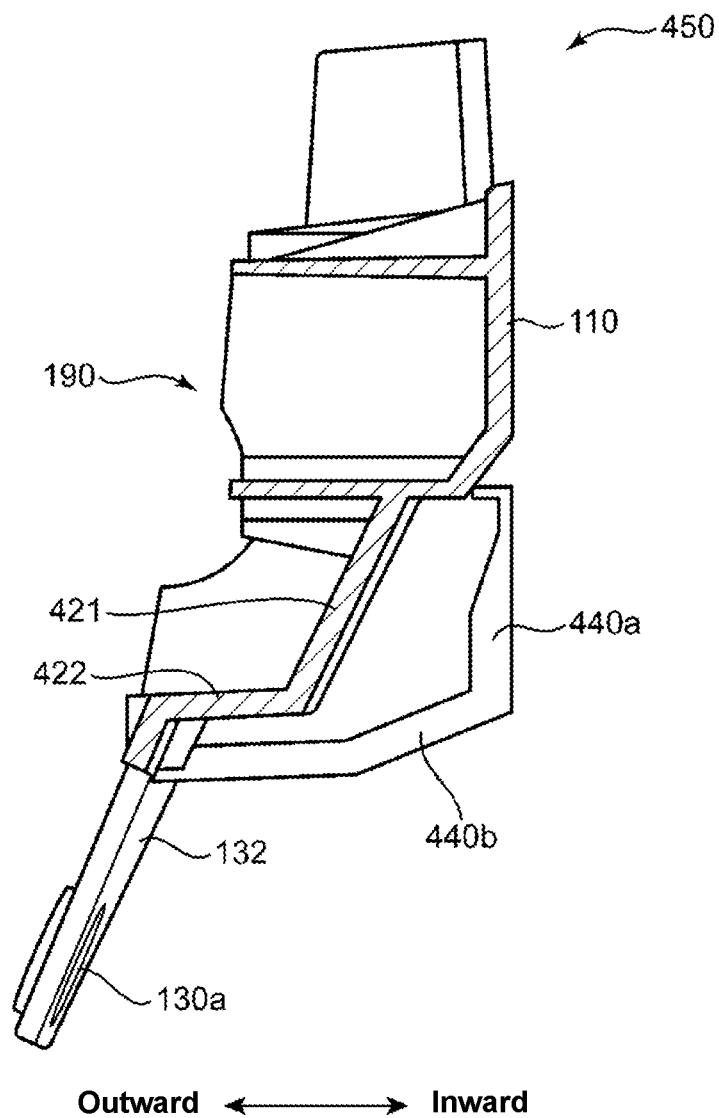
FIG. 16 is a schematic sectional view taken along line XVI-XVI of FIG. 15.

Additionally, a bracket 450 shown in FIGS. 15 and 16 (a schematic sectional view taken along line XVI-XVI of FIG. 15) may be used. Specifically, this bracket 450 according to a third embodiment comprises a bottom wall part 420 which comprises a first bottom wall portion 421 and a second bottom wall portion 422, the first vertical wall part 110, and the second vertical wall part 130, similarly to the bracket 50 shown in FIG. 7 and others. Meanwhile, the bracket 450 according to the third embodiment has plural members, each of which comprises an extension piece 440a and a connection piece 440b, in place of the first holding piece 140 shown in FIG. 7 and others, wherein the plural members are spaced apart from each other in the longitudinal direction.

More specifically, the extension piece 440a is configured in a plate shape to extend downwardly from a cabin-side end portion of the first bottom wall portion 421. The connection piece 440b is configured in a plate shape to roughly horizontally extend to the vehicle outside from a lower edge of the extension piece 440a. The connection piece 440b extends to the vehicle outside from a cabin-side face of the second vertical wall part 130 and connects the second vertical wall part 130 and a lower edge of the extension piece 440a of the second bottom wall portion 422. The second vertical wall part 130 extends downwardly from a vehicle-outside end portion of the second bottom wall portion 422, and the connection piece 440b connects the vehicle-outside end portion of the second bottom wall portion 422 and thereby the bottom wall part 420 and the lower edge of the extension piece 440a via the second vertical wall part 130. In the bracket 450 according to the third embodiment, the above-described extension piece 440a corresponds to the "second guide part" recited in the claims. Further, the first vertical wall part 110 corresponds to the "first guide part" recited in the claims as well.

According to the bracket 450 of the third embodiment, the top ceiling 6 is held between the connection pieces 440b and the upper edge 33 of the pillar trim 30. The extension pieces 440a close a gap between the first vertical wall part 110 and the top ceiling 6, so that the deployment of the curtain airbag 71 to the vehicle outside is prevented by the first vertical wall part 110 and the extension pieces 440a, and also the curtain airbag 71's coming into a gap between the first vertical wall part 110 and the upper edge 33 of the pillar trim 30 is prevented by the extension pieces 440a. Further, the above-described gap is closed along the vehicle width direction with the connection pieces 440b, so that the curtain airbag 71's coming into this gap is prevented.

The extension pieces 440a and the connection pieces 440b can be made by extruding part of the first bottom wall portion 121 and the second bottom portion 122 of the bracket 50 according to the first embodiment. Thereby, according to the bracket 450 of the third embodiment, the portion which restrains the curtain airbag 71 from coming into the gap between the first vertical wall part 110 and the upper edge 33 of the pillar trim 30 can be formed easily. Further, since portions of the bottom wall portions 421, 422 which correspond to the extension portions 440a and the connection pieces 440b, respectively, are removed, the weight of the bracket 450 is reduced. In FIGS. 15 and 16, members which have the same structure as the bracket 50 shown in FIG. 7 and others are denoted by the same reference characters.

Moreover, in the bracket 450 of the third embodiment, the connection pieces 440b may be omitted. Even in this case, it is retrained by the extension pieces 440a that the curtain airbag 71 comes into the gap between the first vertical wall part 110 and the upper edge 33 of the pillar trim 30 as well. However, in the case where the connection pieces 440b are provided so that the lower edges of the extension pieces 440a and the vehicle-outside end portion of the second bottom wall portion 422 are interconnected therewith, the rigidity of the extension pieces 440a are so increased that it can be prevented more securely by the extension pieces 440a that the curtain airbag 71 is deployed to the vehicle outside. Further, since the gap between the first vertical wall part 110 and the pillar trim 30 can be closed with the connection pieces 440*b* along the vehicle width direction as described above, the curtain airbag 71 can be prevented from coming into this gap more securely.

What is claimed is:

1. An upper interior structure of a vehicle, comprising:
a pillar trim attached to a pillar which partitions an opening portion of the vehicle and covering the pillar from a side of a cabin;
a top ceiling provided above the pillar trim and covering a ceiling of the cabin;
a curtain airbag stored above the top ceiling and capable of being deployed so as to cover a side wall of the cabin; and
a deployment guide portion for guiding the curtain airbag toward the side of the cabin when the curtain airbag is deployed,
wherein said deployment guide portion comprises a first guide part and a second guide part, said first guide part being arranged above said top ceiling and on an outward side, in a vehicle width direction, of said curtain airbag, facing an upper end portion of said pillar trim, so as to restrain the curtain airbag from being deployed outwardly in the vehicle width direction, said second guide part being arranged between said first guide part and said top ceiling, extending in a vertical direction, so as to restrain the curtain airbag from being deployed into a gap between the first guide part and the upper end portion of the pillar trim, and
said first guide part of the deployment guide portion is configured to extend in a vehicle longitudinal direction and in the vertical direction, said deployment guide portion further comprises a bottom wall part which is configured to extend outwardly, in the vehicle width direction, from a lower end portion of said first guide part, and said second guide part of the deployment guide portion is comprised of plural parts which are respectively configured to extend downwardly from said bottom wall part and spaced apart from each other in the vehicle longitudinal direction.

2. The upper interior structure of the vehicle of claim 1, wherein each of said plural parts of the second guide part of the deployment guide portion is of a plate shape having a face substantially perpendicular to the vehicle longitudinal direction.

3. The upper interior structure of the vehicle of claim 2, wherein said each of the plural parts of the second guide part of the deployment guide portion is configured to extend from an inward end, in the vehicle width direction, of said bottom wall part to an outward end, in the vehicle width direction, of said bottom wall part.

4. The upper interior structure of the vehicle of claim 1, wherein each of said plural parts of the second guide part of the deployment guide portion is configured to extend downwardly from the vicinity of an inward end, in the vehicle width direction, of said bottom wall part.

5. The upper interior structure of the vehicle of claim 4, wherein said deployment guide portion further comprises a connecting piece which extends outwardly, in the vehicle width direction, from a lower end portion of said each of the plural parts of the second guide part, said connecting piece being connected to an outward end, in the vehicle width direction, of said bottom wall part.

* * * * *